United States Patent

Isobe et al.

Patent Number: 6,114,418
Date of Patent: Sep. 5, 2000

[54] NONIONIC EMULSIFIER FOR ASPHALT

[75] Inventors: Kazuo Isobe; Ryoichi Tamaki, both of Wakayama, Japan

[73] Assignee: Kao Corporation, Tokyo, Japan

[21] Appl. No.: 09/174,012

[22] Filed: Oct. 16, 1998

[30] Foreign Application Priority Data

Oct. 20, 1997 [JP] Japan ................................. 9-286817

[51] Int. Cl.⁷ ...................................................... C08J 3/05
[52] U.S. Cl. ........................... 524/64; 106/277; 252/314; 524/69
[58] Field of Search ........................... 106/277; 252/314; 524/64, 69

[56] References Cited

U.S. PATENT DOCUMENTS 3,740,344  6/1973  Ferm.
5,120,708  6/1992  Melear et al..

FOREIGN PATENT DOCUMENTS 47-35059  9/1972  Japan.
56-8462   1/1981  Japan.
1058056   2/1967  United Kingdom.

*Primary Examiner*—Robert Dawson
*Assistant Examiner*—D. Aylward
*Attorney, Agent, or Firm*—Birch, Stewart, Kolasch, & Birch, LLP.

[57] ABSTRACT

The present invention provides an oil-in-water asphalt emulsion having excellent stability in a stationary state. That is, the present invention provides a method for emulsifying an asphalt in water, which comprises the step of mixing the asphalt and water with an emulsifier comprising a nonionic compound (1) having the formula (1):

$$R—O—(C_2H_4O)_x—(CH(CH_3)—CH_2—O)_y—(C_2H_4O)_z—H \quad (1)$$

in which R is an alkyl or an alkenyl, having 8 to 22 carbon atoms, being either straight or branched; x is a number of 0 to 40; y is a number of 1 to 10; and z is a number of 1 to 80.

14 Claims, No Drawings

NONIONIC EMULSIFIER FOR ASPHALT

BACKGROUND OF THE INVENTION

1. Field of the Invention

The present invention relates to a nonionic emulsifier which is used for emulsifying an asphalt and to an oil-in-water asphalt emulsion which is obtained by using the nonionic emulsifier and which has excellent stability in a stationary state and storability.

2. Prior Art

Heretofore, an asphalt has been used in a wide range of applications, for example, an asphalt pavement, an waterproofing adhesive, a material for laying a railroad, and a fuel. A problem associated with the asphalt, however, is its very poor workability because the viscosity of asphalt is very high at a normal temperature. Accordingly, in order to secure a desired workability of the asphalt at a normal temperature, there has been a technique which converts the asphalt into a workable form, i.e., an oil-in-water asphalt emulsion having a better fluidity, by using an appropriate emulsifier and water.

As for the emulsifiers for use in oil-in-water asphalt emulsions, an anionic emulsifier, a cationic emulsifier, an amphoteric emulsifier, and a nonionic emulsifier are known, and these emulsifiers are used according to respective applications. Among these emulsifiers, the nonionic emulsifier is characterized by its good chemical stability, i.e., good stability to polyvalent metal ions present in water or mingled in the system from outside as well as to other impurities mingled in the system from outside. Because of this, a nonionic emulsifier is suited for the production of a chemically stable asphalt emulsion.

Examples of these nonionic emulsifiers which are generally used are polyoxyethylene nonylphenyl ether and polyoxyethylene octylphenyl ether. Although these nonionic emulsifiers provide the above-mentioned chemical stability, these nonionic emulsifiers do not provide satisfactory stability in a stationary state and storability of the asphalt emulsion because the asphalt emulsion containing such a nonionic emulsifier is not stable when the asphalt emulsion is left to stand for a long period of time.

The technologies hitherto known of asphalt emulsions by use of nonionic emulsifiers are an oil-in-water asphalt emulsion (described in JP-B No. 47-35059) using an asphalt, a nonionic emulsifier, which is prepared by adding either ethylene oxide or propylene oxide and ethylene oxide to an aryloxy or alkylaryloxy group, and water as well as an asphalt emulsion for use as an O/W prime coat (JP-A No. 56-8462) using an asphalt, a hydrocarbon-based or halogenated hydrocarbon-based organic solvent, a cationic emulsifier, a nonionic emulsifier which is prepared by adding ethylene oxide either to an aliphatic alcohol or to an alkylphenol, and water. However, neither of these emulsions is satisfactory with respect to long-term stability in a stationary state and storability.

SUMMARY OF THE INVENTION

The object of the present invention is to provide a nonionic emulsifier excellent in chemical stability and is suited for an asphalt emulsion excellent in stability in a stationary state and storability and to provide an asphalt emulsion containing the nonionic emulsifier.

The invention provides a method for emulsifying an asphalt material in water, which comprises the step of mixing the asphalt and water with an emulsifier comprising a nonionic compound (1) having the formula (1):

$$R-O-(C_2H_4O)_x-(CH(CH_3)-CH_2-O)_y-(C_2H_4O)_z-H \quad (1)$$

in which R is an alkyl or an alkenyl, having 8 to 22 carbon atoms, being either straight or branched, x is an average number of zero to 80, y is an average number of 1 to 10 and z is an average number of 1 to 80.

It is preferable in the compound (1) that x is a number of zero to 40; in particular x is zero. In a more preferable compound (1), R has 10 to 18 carbon atoms, x is a number of 1 to 30, y is a number of 1 to 8 and z is a number of 1 to 60. The most preferable R is cocoyl.

The invention provides an oil-in-water asphalt emulsion as obtained by the process as defined above and then use of the compound (1) to emulsify an asphalt in water.

In the emulsion of the invention, the asphalt may be straight asphalt, cut-back asphalt, blown asphalt, semi-blown asphalt, a modified asphalt, natural bitumen or a re-produced asphalt.

In the invention it is preferable that 0.02 to 3.0 percent by weight of the compound (1) is used per the total amount of the asphalt and water.

The emulsifier may further comprise 0.02 to 3.0 percent by weight, per the total amount of the asphalt and water, of an anionic surfactant, a cationic surfactant, an amphoteric surfactant or another nonionic surfactant. It may further comprise 0.02 to 3.0 percent by weight, per the total amount of the asphalt and water, of an oligomer surfactant. It may further comprise 0.002 to 0.5 percent by weight, per the total amount of the asphalt and water, of a water-soluble polymer. It may further comprise 0.05 to 0.5 percent by weight, per the total amount of the asphalt and water, of a phenol compound such as tannin and gallic acid. It may further comprise 0.02 to 3.0 percent by weight, per the total amount of the asphalt and water, of an adduct of ethylene oxide to polypropylene. It may further comprise 0.02 to 3.0 percent by weight, per the total amount of the asphalt and water, of an amino-modified lignin.

DETAILED DESCRIPTION OF THE PREFERRED EMBODIMENTS

In the nonionic emulsifier represented by the formula (1), R as a hydrophobic group is an alkyl or an alkenyl, having 8 to 22 carbon atoms, being either straight or branched, and preferably an alkyl or an alkenyl, having 10 to 18 carbon atoms, being either straight or branched; x denotes an average of moles of ethylene oxide added and is a number of 0 to 80, preferably a number of 0 to 40, more preferably a number of 0 to 30, further preferably a number of 1 to 30, and most preferably a number of 3 to 25; y denotes an average of moles of propylene oxide added and is a number of 1 to 10, preferably a number of 1 to 8, and more preferably a number of 3 to 6; and z denotes an average of moles of ethylene oxide added and is a number of 1 to 80, preferably a number of 1 to 60, and more preferably a number of 5 to 40.

The nonionic emulsifier represented by the formula (1) is a block polymer obtained by adding alkylene oxide to an alcohol having a long chain, wherein the polymer chain ends have ethylene oxide added thereto. Preferably, this nonionic emulsifier is a tri-block polymer obtained by a process comprising the steps of adding ethylene oxide to an alcohol having a long chain, adding propylene oxide to the resulting compound, and again adding ethylene oxide to the resulting compound. If the nonionic emulsifier is a compound in which propylene oxide is added to the polymer chain ends, the desired stability in a stationary state and storability cannot be attained.

If necessary, an anionic emulsifier, a cationic emulsifier, an amphoteric emulsifier, or another nonionic emulsifier can be used together with the nonionic emulsifier of the present invention for an asphalt. Examples of the anionic emulsifier include a fatty acid, an alkyl sulfate, an alkyl ether sulfate, an alkylbenzenesulfonic acid, an alkylphosphoric acid, and salts thereof. Examples of the cationic emulsifier include mineral acid salts, lower carboxylic acid salts, or quaternary ammonium salts of amines such as an alkylamine, an alkylpolyamine, an amideamine, and an alkylimidazoline. Examples of the amphoteric emulsifier include carbobetaine, amidebetaine, sulfobetaine, imidazoliniumbetaine, and an amine oxide. Examples of the another nonionic emulsifier include a sorbitan ester, an adduct of alkylene oxide to sorbitan ester, an adduct of ethylene oxide to alcohol having a long chain, an adduct of ethylene oxide to polypropylene, e.g., Pluronic (manufactured by Wyandotte Chemicals Corp.) or like, an adduct of ethylene oxide to alkylphenol, and an alkyl glycoside. The preferable amount added of the above-mentioned surfactant is 0.02 to 3.0 percent by weight per the total weight of the asphalt and water.

Besides, in order to transform the nonionic emulsifier of the present invention for an asphalt into an emulsifier in a state of, for example, a liquid, the nonionic emulsifier may comprise a solvent, such as water, a lower alcohol, glycol, or polyoxyethylene glycol, a saccharide, such as glucose or sorbitol, and a hydrotrope such as a lower fatty acid, a lower amine, p-toluenesulfonic acid, or ethercarboxylic acid.

Further, in order to improve the miscibility between aggregates and cement when paving a road, an oligomer-type surfactant may be added to the nonionic emulsifier of the present invention for an asphalt. Examples of the oligomer-type surfactant include sodium polyacrylate, sodium naphthalenesulfonate, sodium ligninsulfonate, and amino-modified lignin. The preferable amount added of the oligomer-type surfactant is 0.02 to 3.0 percent by weight per the total weight of the asphalt and water.

Furthermore, in order to further improve the storability of the asphalt emulsion, a water-soluble polymer may be added to the nonionic emulsifier of the present invention for an asphalt. Examples of the water-soluble polymer include poly(vinyl alcohol), hydroxyethyl cellulose, cationized cellulose, methyl cellulose, and gums. The preferable amount added of the water-soluble polymer is 0.002 to 0.5 percent by weight per the total weight of the asphalt and water. Still further, in order to improve the adhesion between aggregates and asphalt after paving a road, a phenolic compound, such as tannin or gallic acid, may be added to the nonionic emulsifier of the present invention for an asphalt. The preferable amount added of the phenolic compound is 0.05 to 0.5 percent by weight per the total weight of the asphalt and water.

By taking economics into account, ordinarily the amount added of the nonionic emulsifier for an asphalt for obtaining excellent stability in a stationary state and storability of an asphalt emulsion is preferably 0.02 to 3 percent by weight, more preferably 0.05 to 3.0 percent by weight, and most preferably 0.1 to 3.0 percent by weight, per the total weight of the asphalt and water.

The oil-in-water asphalt emulsion of the present invention comprises an asphalt, a nonionic emulsifier represented by the formula (1), and water.

Examples of the asphalt to be used in the present invention include straight asphalt, cut-back asphalt, blown asphalt, semi-blown asphalt, modified asphalt, natural bitumen, and reproduced asphalt.

As for the content of asphalt and the content of water in the oil-in-water asphalt emulsion for obtaining an emulsion which is fluid at a normal temperature and has the desired stability in a stationary state and storability, the content of asphalt is 40 to 80 percent by weight and preferably 50 to 75 percent by weight; and the content of water is 20 to 60 percent by weight and preferably 25 to 50 percent by weight. The content of the nonionic emulsifier is described previously.

If necessary, the oil-in-water asphalt emulsion may further comprise an anionic emulsifier, a cationic emulsifier, an amphoteric emulsifier, and another nonionic emulsifier, each of which is described previously.

In addition, if necessary, the oil-in-water asphalt emulsion may further comprise a solvent, a saccharide, a hydrotrope, a water-soluble polymer, and a phenolic compound, each of which is described previously. For the purpose of enhancing emulsifiability, the oil-in-water asphalt emulsion may further comprise an inorganic salt such as sodium chloride, potassium chloride, calcium chloride, and aluminum chloride.

The pH of the oil-in-water asphalt emulsion of the present invention is not particularly limited, and the pH can be appropriately selected depending on the purposes and the compounds employed.

The oil-in-water asphalt emulsion of the present invention can be prepared by an emulsifying machine such as a colloid mill, a barrel-type homogenizer, a homogenizer, or a line mixer. The emulsifying machine is appropriately selected according to the purpose.

The oil-in-water asphalt emulsion, which is obtained by use of the nonionic emulsifier of the present invention for an asphalt, has excellent stability in a stationary state and storability. Therefore, since the loss of the asphalt component in the emulsion can be minimized, the working cost in the use of the emulsion can be reduced. The nonionic emulsifier of the present invention for an asphalt and the oil-in-water asphalt emulsion, which is obtained by using the nonionic emulsifier, can be used in a wide range of applications such as an asphalt pavement, an water-proofing adhesive, a material for laying a railroad, and a fuel.

EXAMPLES

The following examples further illustrate the present invention. They are not to be construed to limit the scope of the present invention in any manner whatsoever.

Examples 1 to 8 and Comparative Examples 1, and 3 to 6

Oil-in-water asphalt emulsions of the present invention were obtained by emulsifying a straight asphalt according to the following process using the emulsifiers shown in Table 1. The oil-in-water asphalt emulsions thus obtained were subjected to the measurement of asphalt concentration and the stability test in a stationary state. The results are shown in Table 1.

Process for Preparing an Oil-In-Water Asphalt Emulsion

A straight asphalt having a penetration in the range of 80 to 100 was melted by heating it to 150° C. Meanwhile, an aqueous solution of emulsifier was obtained by dissolving in water kept at 50° C. a nonionic emulsifier shown in Table 1 in an amount equivalent to 1.0 percent by weight per the total weight of the asphalt and water. 40 parts by weight of the aqueous solution of emulsifier thus obtained and 60 parts of the molten asphalt at 150° C. were simultaneously introduced into a colloid mill and emulsified. In this way, an oil-in-water asphalt emulsion was prepared.

Asphalt Concentration

In accordance with JIS K 2208, 300 g of the oil-in-water asphalt emulsion was weighed out in a 1500 ml stainless steel vessel, and the vessel was heated by means of an electric heater for about 20 minutes while the oil-in-water asphalt emulsion was agitated with a thermometer rod. After confirming that the bubbling of the oil-in-water asphalt emulsion had ceased and all water had evaporated, the residue was heated to 160° C. and kept at this temperature for 1 minute. The residue was then allowed to stand for cooling to room temperature. Then, the residue was weighed. The ratio in percent by weight of the residue to the weight of the oil-in-water asphalt emulsion before undergoing the test was calculated as the asphalt concentration.

Stability in a Stationary State

In accordance with JIS K 2208, a prescribed amount of the oil-in-water asphalt emulsion was placed in a cylinder for testing the stability in a stationary state, and the oil-in-water asphalt emulsion was kept in a stationary state for 24 hours. Then, 50 g of the upper portion and 50 g of the lower portion were sampled from the oil-in-water asphalt emulsion. These samples were dried, and a difference between the amounts of evaporation residue was sought. The smaller the difference, the better the stability of the emulsion is and therefore the system of a homogeneous emulsion can be maintained for a longer period of time, thereby indicating a better stability in a stationary state.

TABLE 1

| Kinds of emulsifiers | | Amounts added (wt %) | Concentration of asphalt (wt %) | Stability in a stationary state (after 24 hrs.) |
|---|---|---|---|---|
| Example 1 | RO(EO)$_8$(PO)$_4$(EO)$_8$ (R = Lauryl) | 1.0 | 60.5 | 0.5 |
| Example 2 | RO(EO)$_5$(PO)$_5$(EO)$_{15}$ (R = Myristyl) | 1.0 | 60.5 | 0.4 |
| Example 3 | RO(EO)$_{15}$(PO)$_5$(EO)$_5$ (R = Cocoyl) | 1.0 | 60.7 | 0.7 |
| Example 4 | RO(EO)$_3$(PO)$_5$(EO)$_{30}$ (R = Oleyl) | 1.0 | 60.7 | 0.9 |
| Example 5 | RO(EO)$_{25}$(PO)$_5$(EO)$_{25}$ (R = Cocoyl) | 1.0 | 61.0 | 0.7 |
| Example 6 | RO(PO)$_3$(EO)$_{40}$ (R = Cocoyl) | 1.0 | 60.9 | 1.2 |
| Comparative Example 1 | RO(EO)$_{16}$(PO)$_4$ (R = Lauryl) | 1.0 | 60.6 | 21.4 |
| Comparative Example 3 | RO(EO)$_5$(PO)$_5$(EO)$_{100}$ (R = Myristyl) | 1.0 | 60.8 | 9.5 |
| Comparative Example 4 | RO(EO)$_5$(PO)$_{15}$(EO)$_{15}$ (R = Cocoyl) | 1.0 | 60.5 | 23.1 |
| Comparative Example 5 | RO(EO)$_{50}$ (R = Lauryl) | 1.0 | 60.7 | 16.5 |
| Comparative Example 6 | Nonylphenol(EO)$_{20}$ | 1.0 | 60.5 | 7.4 |
| Example 7 | RO(EO)$_{30}$(PO)$_4$(EO)$_{30}$ (R = Lauryl) HO(EO)$_{70}$(PO)$_{30}$(EO)$_{70}$OH | 0.8 0.4 | 60.8 | 0.2 |
| Example 8 | RO(EO)$_{25}$(PO)$_4$(EO)$_{25}$ (R = Myristyl) Amino-modified lignin | 0.8 0.4 | 60.4 | 0.6 |

TABLE 1-continued

| Kinds of emulsifiers | | Amounts added (wt %) | Concentration of asphalt (wt %) | Stability in a stationary state (after 24 hrs.) |
|---|---|---|---|---|

It can be seen from the results of Table 1 that the oil-in-water asphalt emulsion of the present invention has excellent stability in a stationary state, and therefore has very good storability.

What is claimed is:

1. A method for emulsifying an asphalt material in water, which comprises the step of mixing the asphalt and water with an emulsifier comprising a nonionic compound (1) having the formula (1):

$$R\!-\!O\!-\!(C_2H_4O)_x\!-\!(CH(CH_3)\!-\!CH_2\!-\!O)_y\!-\!(C_2H_4O)_z\!-\!H \qquad (1)$$

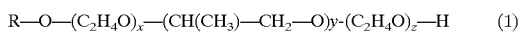

in which R is an alkyl or an alkenyl, having 8 to 22 carbon atoms, being either straight or branched, x is an average number of zero to 80, y is an average number of 1 to 10 and z is an average number of 1 to 80.

2. The method as claimed in claim 1, in which x is a number of zero to 40.

3. The method as claimed in claim 1, in which x is zero.

4. The method as claimed in claim 1, in which R has 10 to 18 carbon atoms, x is a number of 1 to 30, y is a number of 1 to 8 and z is a number of 1 to 60.

5. An oil-in-water asphalt emulsion as obtained by the process as defined in claim 1.

6. The emulsion as claimed in claim 5, in which the asphalt is straight asphalt, cut-back asphalt, blown asphalt, semi-blown asphalt, a modified asphalt, natural bitumen or a reproduced asphalt.

7. The method as claimed in claim 1, in which R is cocoyl.

8. The method as claimed in claim 1, in which 0.02 to 3.0 percent by weight of the compound (1) is used per the total amount of the asphalt and water.

9. The method as claimed in claim 1, in which the emulsifier further comprises 0.02 to 3.0 percent by weight, per the total amount of the asphalt and water, of an anionic surfactant, a cationic surfactant, an amphoteric surfactant or another nonionic surfactant.

10. The method as claimed in claim 1, in which the emulsifier further comprises 0.02 to 3.0 percent by weight, per the total amount of the asphalt and water, of an oligomer surfactant selected from the group consisting of sodium polyacrylate, sodium naphthalenesulfonate, sodium ligninsulfonate, and amino-modified lignin.

11. The method as claimed in claim 1, in which the emulsifier further comprises 0.002 to 0.5 percent by weight, per the total amount of the asphalt and water, of a water-soluble polymer.

12. The method as claimed in claim 1, in which the emulsifier further comprises 0.05 to 0.5 percent by weight, per the total amount of the asphalt and water, of a phenol compound.

13. The method as claimed in claim 1, in which the emulsifier further comprises 0.02 to 3.0 percent by weight, per the total amount of the asphalt and water, of an adduct of ethylene oxide to polypropylene.

14. The method as claimed in claim 1, in which the emulsifier further comprises 0.02 to 3.0 percent by weight, per the total amount of the asphalt and water, of an amino-modified lignin.

* * * * *